United States Patent [19]

Sims

[11] 4,274,526
[45] Jun. 23, 1981

[54] INFLATABLE STRUCTURES OF RUBBERIZED FABRIC

[75] Inventor: Gerald S. Sims, Clinton, Ohio

[73] Assignee: The B. F. Goodrich Company

[21] Appl. No.: 51,560

[22] Filed: Jun. 25, 1979

[51] Int. Cl.³ .............................................. A62B 1/20
[52] U.S. Cl. .................................. 193/25 B; 182/48; 244/137 P
[58] Field of Search .............. 193/25 B; 244/137 P, 244/DIG. 4; 182/48; 9/2 A, 11 A; 152/354 R; 428/107-113, 212, 252, 288

[56] References Cited

U.S. PATENT DOCUMENTS

| 33,361 | 9/1861 | Newell | 428/112 |
|---|---|---|---|
| 2,191,374 | 2/1940 | Dixon | 9/2 A X |
| 3,212,627 | 10/1965 | Beebee | 428/110 X |
| 3,473,641 | 10/1969 | Fisher | 193/25 B |
| 3,829,353 | 8/1974 | Fisher | 193/25 B X |
| 4,177,852 | 12/1979 | Merli et al. | 152/354 |

Primary Examiner—James L. Rowland
Attorney, Agent, or Firm—Harry F. Pepper, Jr

[57] ABSTRACT

An inflatable device, such as an emergency evacuation slide device, is principally composed of rubberized fabric sheet material wherein at least portions of said sheet material is a two ply laminate. The outer or upper ply of this laminate comprises rubberized high strength aramid fabric while the inner or lower ply comprises rubberized nylon fabric. The plies are biased relative to each other such that the warp cords of the outer ply lie at an acute angle relative to the warp cords of the inner ply.

3 Claims, 3 Drawing Figures

INFLATABLE STRUCTURES OF RUBBERIZED FABRIC

BACKGROUND

This invention relates to inflatable structures and particularly to such structures comprising rubberized fabric sheet material.

Many inflatable structures in use today are composed of rubberized fabric sheet material. The kind of fabric sheet utilized in these structures often depends on the particular use or service conditions associated with the inflatable.

Several such inflatables find particular use in emergency situations where the inflatable is packed or stowed in uninflated condition and inflated for utilization upon the occurrence of an emergency. Examples of such emergency devices are aircraft evacuation slides or slide raft combinations, life rafts, off-shore oil drilling platform evacuation slides and helicopter flotation tubes. In these inflatable emergency devices, it is important that the particular fabric sheet which constitutes principally the body of the inflatable be relatively lightweight yet of adequate strength. Thus, the strength to weight ratio of a fabric selected for use in emergency inflatables is of importance.

Also, characteristics in these inflatables is the fact that certain portions of the device can be more susceptible to tear, abrasion, etc., than are other portions. For example, in aircraft or off-shore evacuation slides, the sliding surface of the device is subject to stresses, abrasion and other distinctive forces which could tear or otherwise adversely affect that surface to the point where the device would be inoperable. The specific disposition of the sheet material thus often suggests use of a material of high tear resistance in addition to one of high strength to weight ratio.

SUMMARY

This invention provides a specific rubberized fabric sheet construction useful as the body material of an inflatable emergency device. The sheet construction finds particular utility in those portions of the inflatable body where high stress or force are contemplated or likely to occur which tend to tear or otherwise adversely affect the fabric during use.

Specifically, the sheet of the present invention is a laminate of different fabric materials which in combination, provide a rubberized sheet which has a high strength to weight ratio and is particularly resistant to tear. The fabric comprising the lower or inner layer of the sheet is an aliphatic polyamide fiber material, while the fabric comprising the upper or outer layer is a high tenacity, aromatic polyamide or aramid fiber material.

According to the invention, the laminate is arranged such that the longitudinal or "warp" cords of the upper or outer fabric layer or ply lie at an acute angle relative to the disposition of the warp cords of the lower or inner fabric ply.

Laminate sheets in accordance with the invention as summarized in the foregoing find exemplary utility as sliding surface or panel portions of inflatable emergency evacuation slides or slide/rafts.

THE DRAWINGS

DETAILED DESCRIPTION OF PRESENTLY PREFERRED EMBODIMENTS

Figure 1:
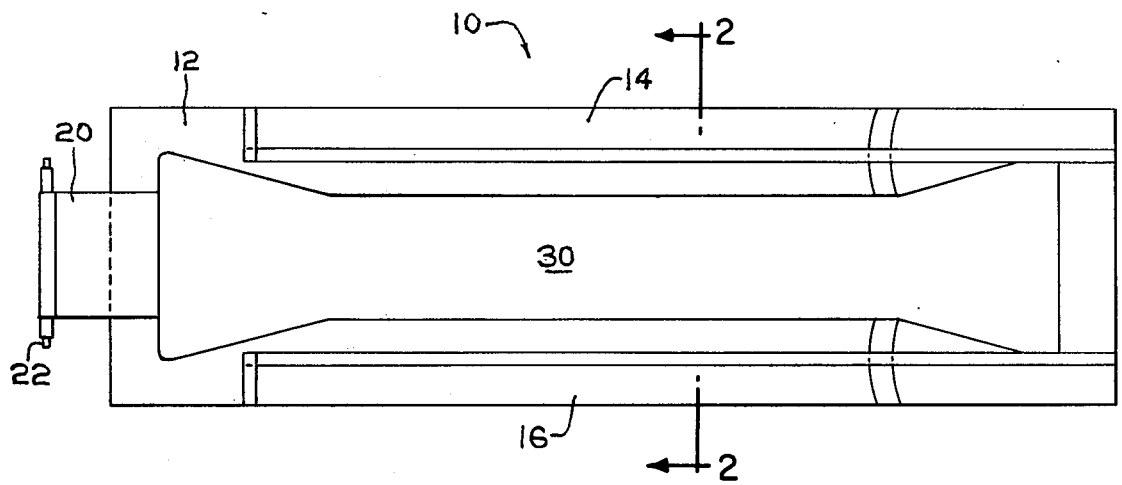
FIG. 1 is a plan view of an inflated emergency evacuation slide which utilizes a fabric sheet construction in accordance with the present invention.
Figure 2:
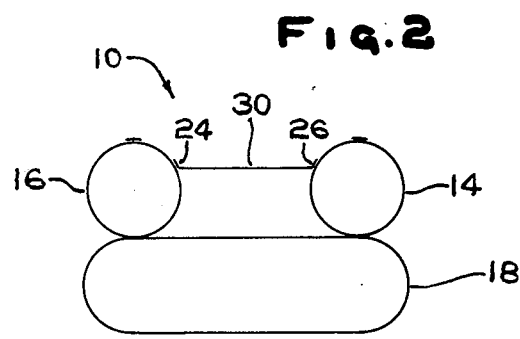
FIG. 2 is a cross-sectional view of the slide structure of FIG. 1 taken along lines 2—2 thereof.

In FIGS. 1 and 2 of the drawings, a typical evacuation or escape slide device 10 is shown which is generally of the type used on aircraft or off-shore oil drilling platforms. In aircraft, these slides are usually packed or stowed uninflated adjacent to aircraft doors and automatically deployed and inflated in the event an emergency evacuation of the passengers and crew of the craft is necessary. In off-shore platforms, such slides are usually packed or stowed in containers at key stations along the platform edges and are quickly deployable for escape from the platform to the water below in the event of explosion, fire or other occurrences calling for emergency evacuation from the platform.

Generally, the slide 10 comprises a forward or upper inflatable section 12, a pair of longitudinal extending inflatable tubular sections 14 and 16 and a transverse supporting, inflatable under section 18, all appropriately joined together by tape or other bonding means. Each of the inflatable sections are usually in fluid communication with one or more adjacent sections so that total inflation of the device is effected by a single fluid source (not shown) or a minimum number of fluid sources.

The slide is secured to the craft or platform by a girt panel member 20 extending from the forward or upper portion of the slide to a girt bar 22 anchored to the craft or platform by appropriate attachments (not shown). A slide surface or panel 30 traverses the space between longitudinal tubular section 14 and 16 with margins 24 and 26 thereof bonded or otherwise secured to surface portions of tubes 14 and 16 respectively. The slide panel 30 is appropriately dimensioned for evacuation by people sliding upon the panel from the forward or upper section of the slide to the lower section.

Figure 3:
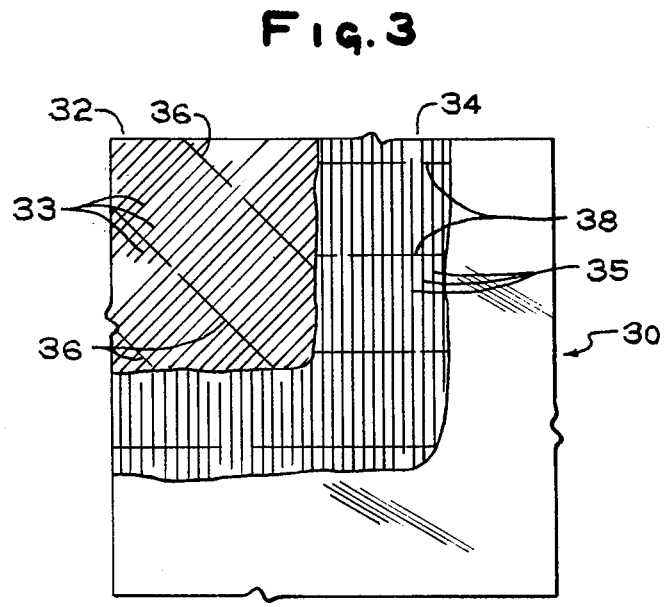
FIG. 3 is an enlarged plan view of a portion of rubberized fabric sheet construction used in the slide of FIGS. 1 and 2 with portions broken away illustrating details of the present invention in accordance with a presently preferred embodiment.

In a presently preferred design, all components or sections of the slide 10, except slide panel 30, are composed of single layer fluid impervious rubberized fabric sheet material. By "rubberized" is meant that the fabric is coated or impregnated with rubber or rubberlike material. Rubberized fabric sheet used in slides such as 10 is often polyurethane or neoprene coated or impregnated nylon. The sheet material used for slide surface 30, in accordance with a preferred embodiment, is best illustrated in FIG. 3. According to FIG. 3, slide panel 30 is a laminate sheet material in the form of a two ply or layer laminate comprising an outer or upper ply 32 and an inner or lower ply 34. Each ply 32 and 34 includes fabric comprising warp strands or cords 33 and 35 respectively. Warp cords 33 of ply 32 are traversed by pluralities of spaced fill or weft strands 36, while warp cords 35 of ply 34 are traversed by a plurality of spaced fill or weft strands 38. Each of plies 32 and 34 also include rubber or rubber-like material, such as neoprene or polyurethane, impregnating or coating the fabric portion thereof.

In accordance with the present invention, the fabric portions of each of plies 32 and 34 are materially different. Upper or outer ply 32 comprises a high strength, aramid fiber material, such as "Kevlar" aramid fiber sold by the Du Pont Corporation. The lower or inner ply 34 comprises aliphatic polyamide fabric such as nylon. Also, in accordance with the present invention, ply 32 is disposed such that warp cords 33 thereof extend at an acute angle relative to the disposition of warp cords 35 of the fabric component of ply 34. Furthermore, in accordance with the invention, it has been found that for the best results, the aramid material used in ply 32 should be substantially stronger than the nylon material used in ply 34.

It is understood that other sheet portions of slide 10 can be constructed similar to slide panel 30 if desired. Also, other inflatable emergency devices can utilize sheet material such as panel 30 where such devices are felt to require rubberized sheet construction with high tear resistance and strength to weight ratios.

The basic property commonly used to characterize the strength of fiber is "tenacity". As was stated previously, the advantages of the invention are best realized when the strength or "tenacity" of the particular aramid used in the outer ply such as 32 substantially exceeds the tenacity of the nylon in the inner ply such as 34. The tenacity of typical nylon is about 8 grams/denier (gpd). "Kevlar" aramid material, comparably, has a typical tenacity of 18 to 20 gpd. Not all aramids have tenacities of such magnitude, however. For example, "Nomex" aramid, sold by the DuPont, fiber has a typical tenacity of around 5 gpd and has not been found particularly satisfactory for the fabric component of the outer or upper ply of the laminate sheet.

Also as stated previously, the strength to weight ratio of the rubberized sheet used in these inflatable structures is important. This is also true for the laminate sheet, such as slide panel 30, constructed in accordance with the present invention. Generally the higher the strength to weight ratio of a particular laminate sheet, the better is its performance when used in high stress areas of an inflatable. To illustrate the unusually high strength to weight ratio of a laminate sheet constructed in accordance with the present invention, several two ply laminate samples of various combinations of rubberized fabric were tested to determine their strength to weight ratios. Each laminate sample tested was approximately a 1 in. strip with the outer or top ply of the laminate disposed so that its warp cords extended at approximately a 45° angle relative to the warp cords in the inner or bottom ply. The weight of each sample was calculated and its tensile strength determined by tests conducted according to Method 5102 of Federal Test Method Standard 191. The following Table I represents the comparative results.

TABLE 1

| LAMINATE MATERIAL | FABRIC WT. | TENSILE | STRENGTH/ WT. RATIO |
|---|---|---|---|
| KEVLAR ARAMID/ NYLON | 3.45 oz/yd² | 350 lbs | 107.5 |

TABLE 1-continued

| LAMINATE MATERIAL | FABRIC WT. | TENSILE | STRENGTH/ WT. RATIO |
|---|---|---|---|
| KEVLAR ARAMID/ NOMEX ARAMID | 5.60 oz/yd² | 260 lbs | 46.4 |
| NYLON/NOMEX ARAMID | 6.35 oz/yd² | 170 lbs | 26.8 |
| NYLON/NYLON | 3.40 oz/yd² | 130 lbs | 38.2 |

As seen from the foregoing table, the strength to weight ratio of the KEVLAR ARAMID/NYLON laminate is over twice that of all the other laminates tested.

Trapezoidal tear tests were conducted on strips similar to those tested above and the results again were indicative of the particular advantages attending the sheet material constructed in accordance with this invention. These tear tests were conducted in accordance with Method 5136 of Federal Test Method Standard 191. The results are represented in Table II below:

TABLE II

| LAMINATE | TRAPEZOIDAL TEAR VALUE (Warp/Weft or Fill) |
|---|---|
| KEVLAR ARAMID/NYLON | 91 lbs/114 lbs |
| KEVLAR ARAMID/NOMEX ARAMID | 86 lbs/80 lbs |
| NYLON/NOMEX ARAMID | 28 lbs/43 lbs |
| NYLON/NYLON | 54 lbs/43 lbs |

As seen in the foregoing table, in each case the KEVLAR ARAMID/NYLON laminate exceeded significantly the other laminates in trapezoidal tear resistance in both the warp and fill directions.

In accordance with the foregoing, it can be seen that the laminate sheet material described exhibits certain significant improvements relative to those properties considered important in inflatable escape devices.

It is understood that the foregoing describes the invention in terms of a presently preferred embodiment with variations and modifications possible within the scope of the invention as measured by the following claims.

I claim:

1. In an inflatable emergency device consisting essentially of structural elements forming an inflatable chamber composed of rubberized fabric sheeting, the improvement wherein at least one of said structural elements is a laminate sheet material consisting essentially of an outer and inner ply of rubberized fabric, said inner ply being disposed nearer said inflatable chamber than said outer ply, and wherein said inner ply comprises nylon fabric material with warp members thereof extending in a predetermined direction, said outer ply comprises aramid fabric material with warp members extending at an acute angle relative to said predetermined direction and the tenacity of said aramid material is substantially greater than the tenacity of said nylon material.

2. The device defined in claim 1 wherein said device is an emergency evacuation slide device.

3. The device defined in claim 2 wherein said at least one selected structural element comprises the slide panel portion of said evacuation slide.

* * * * *